United States Patent Office 3,107,404
Patented Oct. 22, 1963

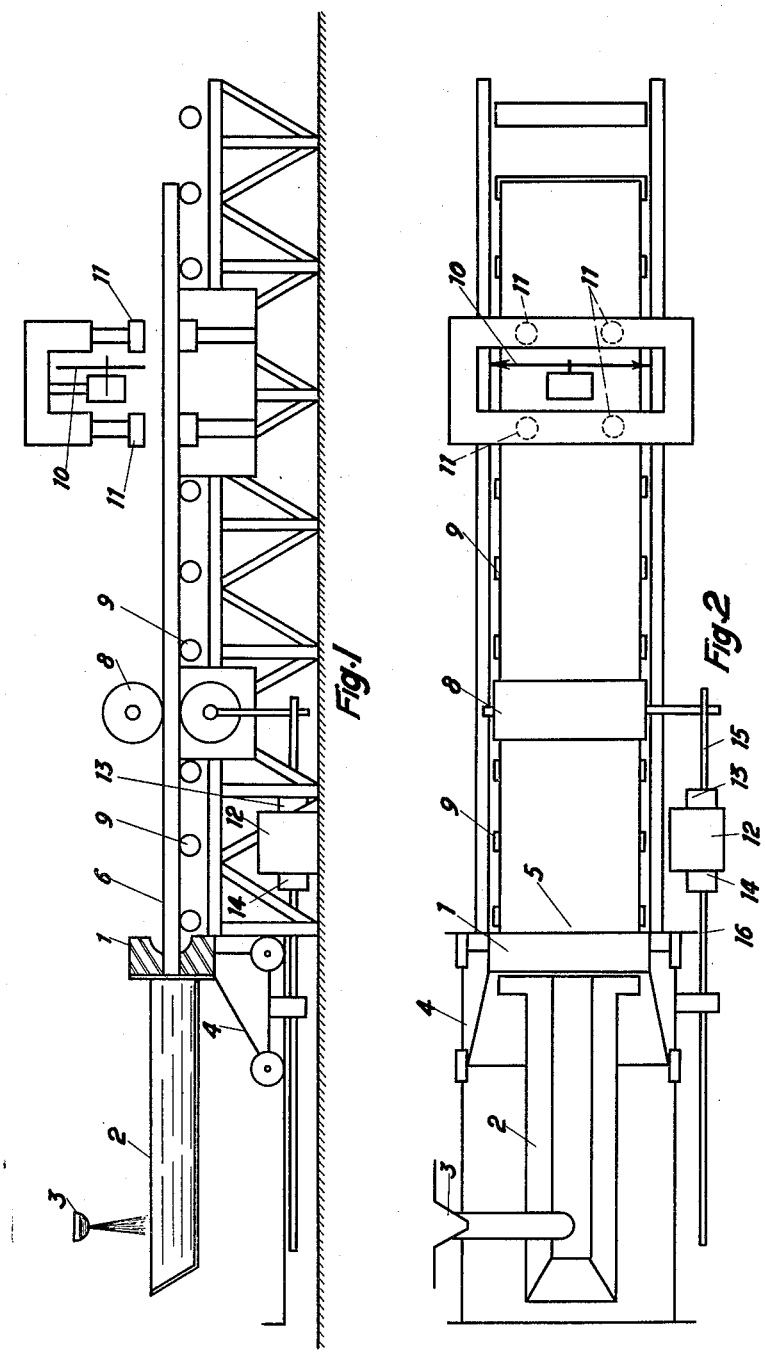

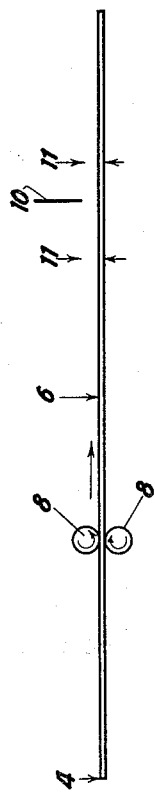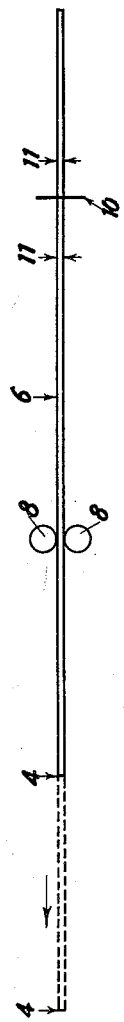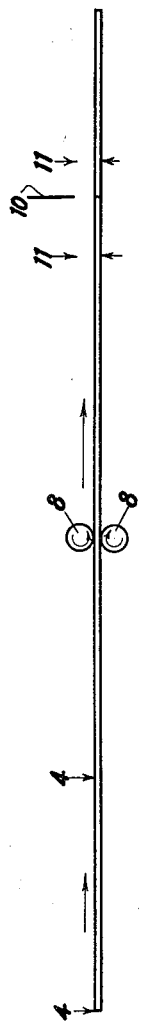

---

3,107,404
CUTTING OF CONTINUOUS CAST BARS
Charles Armand, St. Sigismond, Savoie, and Paul Angleys, Cesarches, Savoie, France, assignors to Société d'Electro-Chimie, d'Electro-Metallurgie et des Acieries Electriques d'Ugine, Paris, France, a corporation of France
Filed Mar. 30, 1961, Ser. No. 99,426
Claims priority, application France Apr. 26, 1960
2 Claims. (Cl. 22—200.1)

This invention relates to the continuous casting of metal bars, billets, tubes, and similar continuously cast or extruded elongated articles, hereinafter generically referred to as bars.

In the continuous casting methods to which the invention relates, the molten metal is cast or extruded through a mold for continuously casting and the resulting bar or other cast product is continuously extracted from said mold by a pair of power-driven extractor rollers or the like. In such a process, it is required to cut the bar as it issues continuously from the extractor means to prescribed lengths, and this cutting has to be done without interrupting the casting operation.

Heretofore, this requirement was generally met by mounting the cutting mechanism, such as a revolving rotary saw, upon a displaceable support, and displacing said support during the cutting operation in the same direction and at the same speed as the displacement of the bar. This has raised difficult practical problems. The size and weight of the rotary cutter mechanisms required increase rapidly with the cross sectional dimensions of the bars to be cut, and their displacement at accurately predetermined speeds and for accurately predetermined times are very difficult to perform successfully. The drive for the cutter support has to be closely synchronized with the drive of the cast article by some means or other, and such synchronization is difficult to effect in the circumstances. These difficulties have considerably complicated and increased the cost of continuous casting systems as heretofore used especially in connection with the casting of large, heavyweight metallurgical products.

It is an object of the invention to simplify continuous casting processes and plant by eliminating the need for a displaceable cutter station. An object is to make it possible, in a continuous casting system, to cut the bar to accurately prescribed lengths without interrupting the casting process and while using a stationary cutting station. An object is to provide continuous casting plant in which the mold assembly rather than the cutting station is displaceable.

In one aspect of the invention, there is provided in a continuous casting process in which a bar is extracted from a mold for continuous casting, a method of cutting said bar to prescribed lengths comprising the steps of cyclically arresting the bar-extracting movement and braking the bar at a stationary cutting station; displacing the mold assembly in reverse from an initial position and cutting the braked bar during said reverse displacement of the mold; resuming the bar extracting movement and simultaneously advancing the mold assembly back to its initial position; all said displacements being effected at velocities so correlated that the relative velocity of the bar with respect to the mold assembly remains at all times constant and equal to a prescribed casting velocity.

The invention further provides a system for continuously casting a bar and cutting it to prescribed lengths, comprising in combination a mold for continuous casting and means supporting the mold assembly for displacement parallel to the direction of the bar; extractor roller means engageable with the bar and rotatable for extracting the bar from the mold assembly; and a stationary cutting assembly beyond said extractor means including means for braking the bar in operative relation to said cutter assembly for a cutting operation.

Means, which may be manually controlled or more preferably automatic, are provided for cyclically displacing the mold, and the extractor rollers, and operating the bar braking means and the cutter, in accordance with a predetermined sequence which will accomplish the process specified above.

An exemplary embodiment of the invention will now be described for purposes of illustration but not of limitation with reference to the accompanying drawings. It is emphasized that while the description and claims refer to a bar as the article being cast, this term is used only for convenience and should be interpreted throughout the specification and the claims as designating any elongated article of uniform cross section susceptible of the continuous casting process here contemplated, such as billets, tubes, strips and the like.

In the drawings,

FIG. 1 is a simplified view of the improved plant in elevation.

FIG. 2 is a corresponding plan.

FIGS. 3, 4 and 5 are diagrams illustrating successive stages of the operation of the plant.

Referring to the drawings, there is shown a mold 1 mounted adjacent a tank 2 into which molten metal is poured from a chute 3. Said tank and mold are carried on a truck 4 movable on a track parallel to the casting direction. The cast bar or billet 6 issuing from the mold 1 is withdrawn forwardly therefrom by a pair of pincher rollers 8 and is further supported on idle supporting rollers 9. Beyond the pincher rollers is positioned a stationary cutting station comprising two vertically displaceable hydraulically actuated means 11 for braking the bar at the cutting station during a cutting operation, and a revolving cutter or saw 10.

A motor unit 12 of suitable type serves to rotate the pincher or extractor rollers 8 by way of drive mechanism 13 and the shaft 15, and simultaneously operates the truck 4 by way of drive mechanism 14 and shaft 16.

The drive mechanism 13 may comprise two sets of gears continually connected with the shaft 15 and selectively connectable, by way of clutch means, with the motor unit 12. By clutching-in a first pair of gears, there is imparted to the rollers 8 an angular speed which will impart to the bar 6 a linear velocity equal to the prescribed casting velocity. By selecting a second pair of gears there is imparted to the extractor rollers 8 a velocity such as to impart to the bar 6 a velocity equal to twice the casting velocity. Simultaneously disconnecting both pairs of gears will arrest the rotation of rollers 8 and arrest the displacement of bar 6.

The drive mechanism 14 comprises two sets of gears continually connected with shaft 16 and selectively connectable by way of clutch means to the motor 12. By selecting a first pair of gears the truck 4 is displaced rearwardly, i.e. leftward, at a velocity equal to the casting velocity. Selecting the other pair of gears will cause truck 4 to advance (i.e. rightward) at a velocity equal to the casting velocity. Disengaging both pairs of gears will cause the truck to remain stationary. Both clutches may be operated through any suitable means from a suitably positioned control station. The operation of the system will be described in four successive stages with reference to FIGS. 3 to 5.

(1) Initially (see FIG. 3) while the bar is being cast and before the cast bar 6 has attained the required length, truck 4 is held stationary in its normal advanced position, bar 6 advances at a velocity which is the casting velocity by the action of rollers 8 driven from motor 12 through drive 13 and shaft 15.

(2) As the bar 6 reaches a length such that the part of it positioned ahead of the cutter 10 equals the desired length to be cut (see FIGS. 3 and 4), the following operations are simultaneously performed through any suitable means such as a manually or automatically operated remote control system of conventional character.

The drive 13 is shifted to neutral whereupon the pinch rollers 8 are no longer rotated and the advance of bar 6 is arrested.

Simultaneously, the jacks 11 are moved downwards to clamp the bar 6 firmly against the lower jack members or supports. The saw 10 is started in rotation; and simultaneously the drive 14 is shifted to the gear condition causing the truck 4 to recede bodily (leftward) at a speed equal to the casting velocity.

(3) After the bar has been cut, the following combination of steps is simultaneously carried out: The jacks 11 are raised to release the bar 6. The drive 13 is shifted to cause the pinch rollers 8 to rotate at a speed corresponding to a bar displacement rate twice the casting velocity. The drive 14 is shifted to reverse the direction of displacement of the truck 4.

(4) The truck 4 is thus returned to its normal advanced position, and when this has been effected, the following set of operations are simultaneously performed: The drive 14 is shifted to neutral thereby arresting the motion of the truck 4. The drive 13 is shifted to its normal gear condition for imparting to the bar a displacement velocity equal to the casting velocity.

The system has now been restored to its initial conditions and a fresh cycle of operations may be performed.

It will be evident from the foregoing that the system of the invention has a number of advantages over conventional arrangements. The total mass of the moving parts is substantially less than that of the cutter assembly, so that less power is required, installation is facilitated and its cost reduced, inertia effects are diminished and the required synchronism is easier to maintain.

The length of the cut bar can be modified at will by reducing or increasing the time duration of the first stage of the cycle so as to start the actual sawing operation at a time when the portion of the bar 6 ahead of the saw 10 has the desired length. It will however be apparent that the minimum length to which the bar can be cut is determined by the length of the bar that is cast during the second and third stages of the cycle, since during these stages the bar 6 continues to advance at the casting velocity. This minimum length is twice the length of bar cast during the sawing operation; it is, therefore, determined both by the time required by the sawing operation and by the casting velocity. In actual practice, in the case of a bar of cross-sectional size 60 x 100 mm., the minimum length between successive cuts can readily be made no greater than about 50 cm. or less, and this is fully satisfactory for most purposes.

What we claim is:

1. In a continuously casting process in which a product is continuously formed and is extracted from a mold for continuous casting at a prescribed casting velocity, a method of cutting said product to prescribed lengths comprising the steps of cyclically arresting the product extracting movement and braking the product at a cutting station; displacing the mold in reverse, and in a direction parallel to the direction of movement of the product being continuously cast, from an initial position at a velocity corresponding to said prescribed casting velocity; cutting the braked product during said reverse displacement of the mold; resuming the product extracting movement at twice the prescribed casting velocity and simultaneously advancing the mold at the prescribed casting velocity back to its initial position; and extracting the product at the prescribed casting velocity upon return of the mold to its initial position.

2. In a continuously casting process in which a product is continuously formed and is extracted from a mold for continuous casting, a method of cutting said product to prescribed lengths comprising the steps of cyclically arresting the product extracting movement and braking the product at a cutting station; displacing the mold in reverse, and in a direction parallel to the direction of movement of the product being continuously cast, from an initial position and cutting the braked product during said reverse displacement of the mold; resuming the product extracting movement and simultaneously advancing the mold back to its initial position, all said displacements being effected at velocities such that the relative velocity of the product with respect to the mold remains at all times constant and equal to a prescribed casting velocity.

References Cited in the file of this patent
UNITED STATES PATENTS

| | | |
|---|---|---|
| 1,088,171 | Pehrson | Feb. 24, 1914 |
| 2,264,287 | Betterton et al. | Dec. 2, 1941 |
| 2,655,212 | Stewart | Oct. 13, 1953 |